United States Patent [19]

Scifres et al.

[11] Patent Number: 4,530,574
[45] Date of Patent: Jul. 23, 1985

[54] BEAM COLLIMATION AND FOCUSING OF MULTI-EMITTER OR BROAD EMITTER LASERS

[75] Inventors: Donald R. Scifres, Los Altos; Robert A. Sprague, Saratoga, both of Calif.

[73] Assignee: Xerox Corporation, Stamford, Conn.

[21] Appl. No.: 637,708

[22] Filed: Aug. 6, 1984

Related U.S. Application Data

[63] Continuation of Ser. No. 402,695, Jul. 28, 1982, abandoned.

[51] Int. Cl.³ .............................................. G02B 13/08
[52] U.S. Cl. ..................................... 350/420; 350/433
[58] Field of Search ...................... 350/420, 433, 421

[56] References Cited

U.S. PATENT DOCUMENTS

| | | | |
|---|---|---|---|
| 3,317,267 | 5/1967 | Offner | 350/420 |
| 3,701,044 | 10/1972 | Paoli et al. | |
| 4,203,652 | 5/1980 | Hanada | |
| 4,235,507 | 11/1980 | Kataoka et al. | 350/19 |
| 4,246,548 | 1/1981 | Rutz | 372/44 |
| 4,253,735 | 3/1981 | Kawamura et al. | |
| 4,255,717 | 3/1981 | Scifres et al. | |
| 4,272,651 | 6/1981 | Yoshida et al. | 369/112 |
| 4,280,108 | 7/1981 | Scifres et al. | |
| 4,306,278 | 12/1981 | Fulton et al. | 362/259 |
| 4,318,594 | 3/1982 | Hanada | 350/433 |
| 4,323,297 | 4/1982 | Kawamura et al. | |

FOREIGN PATENT DOCUMENTS

54-44553 4/1979 Japan .

OTHER PUBLICATIONS

Phase-Locked Semiconductor Laser Array; Scifres et al., Xerox: Appl. Phys. Lett., 33(12), 12-78.

Primary Examiner—John K. Corbin
Assistant Examiner—Paul M. Dzierzynski
Attorney, Agent, or Firm—W. Douglas Carothers, Jr.

[57] ABSTRACT

An optical system for collimating the radiation from a semiconductor laser, the laser near field having a single beam waist position in a first direction and having an elongated but phase coherent near field emitting pattern in a second direction which forms a far field low divergence beam pattern, the optical system characterized by a lens system for imaging said near field of said single beam waist position in the first spatial direction while imaging the elongated, phase coherent far field radiation pattern in the second direction. The laser is a multi-emitter or broad emitter semiconductor laser capable of producing one or more output beams. The lens system may include focusing optics to focus radiation in the near field pattern emitted from the laser in the first direction and in the far field pattern of radiation emitted from the laser in the second direction.

6 Claims, 23 Drawing Figures

PRIOR ART

BEAM COLLIMATION AND FOCUSING OF MULTI-EMITTER OR BROAD EMITTER LASERS

This is a continuation of application Ser. No. 402,695, filed July 28, 1982, now abandoned.

BACKGROUND OF THE INVENTION

This invention relates to an optical system for providing beam collimation or beam focusing from a multi-emitter or broad emitter semiconductor laser having a phase locked radiation pattern emitting from a common p-n planar junction.

In conventional semiconductor lasers, the beam emitted from a facet of the laser is usually focused to a small spot in order to meet the needs of various applications, such as optical disk storage and laser printing, by means of reimaging the laser near field pattern to the desired image plane. Examples of optical systems designed for beam forming, focusing or shaping are disclosed in U.S. Pat. Nos. 4,203,652; 4,253,735 and 4,323,297.

As indicated in these patents, semiconductor lasers possess different points of origin of divergence (also referred to as beam waist positions) as well as angles of divergence for radiation emitted from the laser facet in directions orthogonal to each other, i.e., in a vertical emission direction which is perpendicular to the p-n planar junction and in a lateral emission direction which is parallel to and along the p-n planar junction. The points of origin of divergence also vary relative to different kinds of laser geometry as illustrated in FIGS. 1 and 2.

Figure 1A:
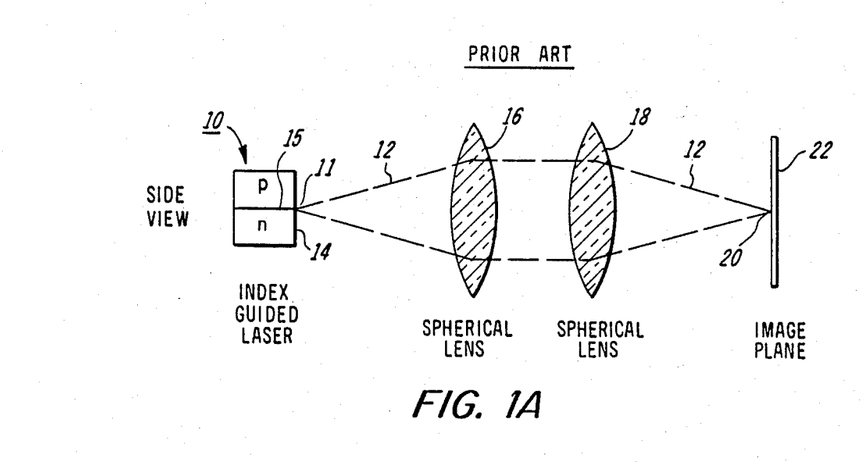
FIGS. 1A and 1B illustrate the conventional optical system for focusing the beam from an index guided laser.
Figure 1B:
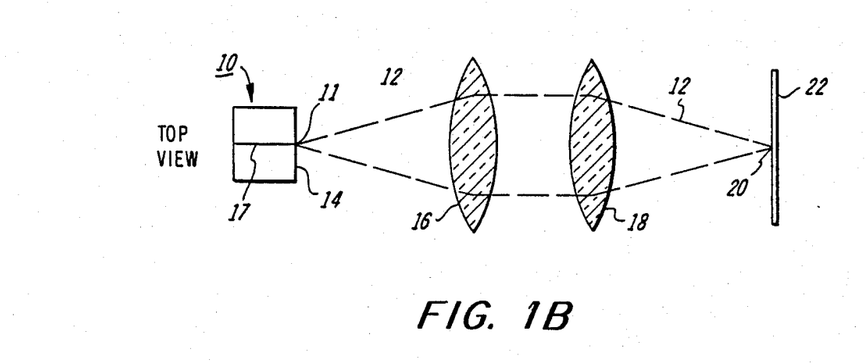

In FIG. 1, the radiation beam characteristics for an index guided laser are illustrated. An index guided laser depends on differences in the index of refraction of materials due to the structural geometry of the laser, e.g., nonplanar layers, channels, mesas, etc., to guide the propagating radiation. As illustrated in FIGS. 1A and 1B, radiation in both the vertical and lateral emission direction of laser 10 has a point of origin of divergence or beam waist position 11 at the laser facet 14. This beam waist position 11 is called the near field of the laser. In side view of FIG. 1A, radiation in the vertical emission direction of laser 10 has a point of origin of divergence or beam waist position 11 at facet 14 at the point of emission from the laser optical cavity as represented by by the p-n junction 15. In the top view of FIG. 1B, radiation in the lateral emission direction of laser 10 has a point of origin of divergence or beam waist position 11 also at facet 14 at the point of emission from the laser optical cavity as represented by line 17, which line is illustrative of the laser stripe geometry. Spherical lens 16 collimates beam 12 from laser 10 and spherical lens 18 focuses beam 12 to a spot 20 onto image plane 22. Because the beam waists 11 in both the vertical and lateral directions lie at facet surface 14 in an index guided laser, the near field pattern of the laser can be imaged into a diffraction limited spot 20 at the image plane 22.

Figure 2A:
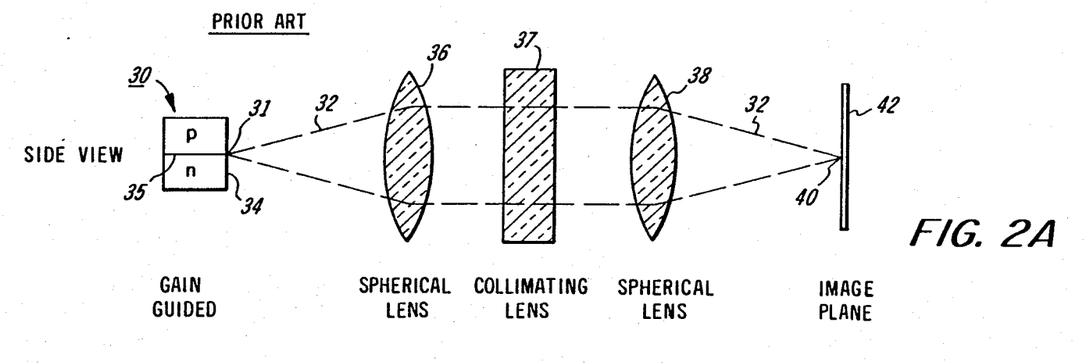
FIGS. 2A and 2B illustrate the conventional optical system for focusing the beam from a gain guided laser.
Figure 2B:
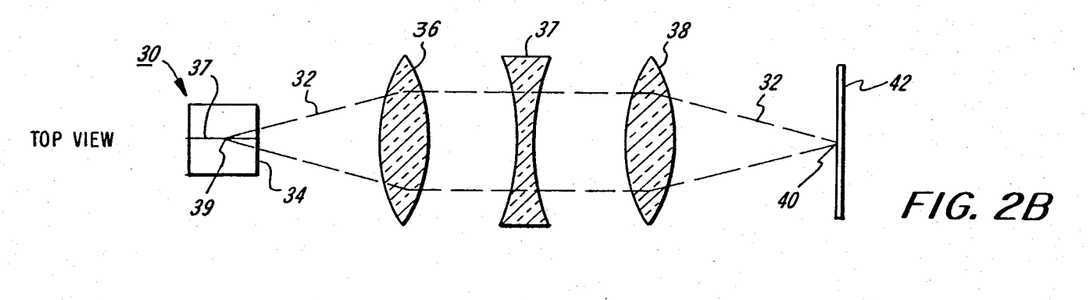

A more difficult situation is present in gain guided lasers, illustrated in FIG. 2 where the radiation beam characteristics are illustrated for such a laser. A gain guided laser depends on current dependent differences in the index of refraction of semiconductor materials comprising the structural layers of the laser to guide the propagating radiation. As illustrated in the side view of FIG. 2A, radiation in the vertical emission direction of laser 30 has a point of origin of divergence or beam waist position 31 at the laser facet 34 and at the p-n planar junction 35. Spherical lens 36 collimates beam 32 from laser 30 and spherical lens 38 focuses beam 32 to a spot 40 onto image plane 42. In the top view of FIG. 2B, however, radiation in the lateral emission direction of laser 30 has a point of origin of divergence or beam waist position well within laser 30, e.g., 10 to 40 μm behind facet 34, as indicated at 39. The line 37 is illustrative of the laser stripe geometry and the position of the optical cavity of the laser. Because of this factor, the image plane for the beam in the lateral emission direction will not be in the same plane as the vertical emission direction if lens 37 is omitted. As a result, lens 36 will not be at the proper focal point. With the addition of the convex collimating lens 37, however, the near field pattern of the beam 32 can be collimated for focus by lens 38 to a spot 40 onto image plane 42.

Figure 3:
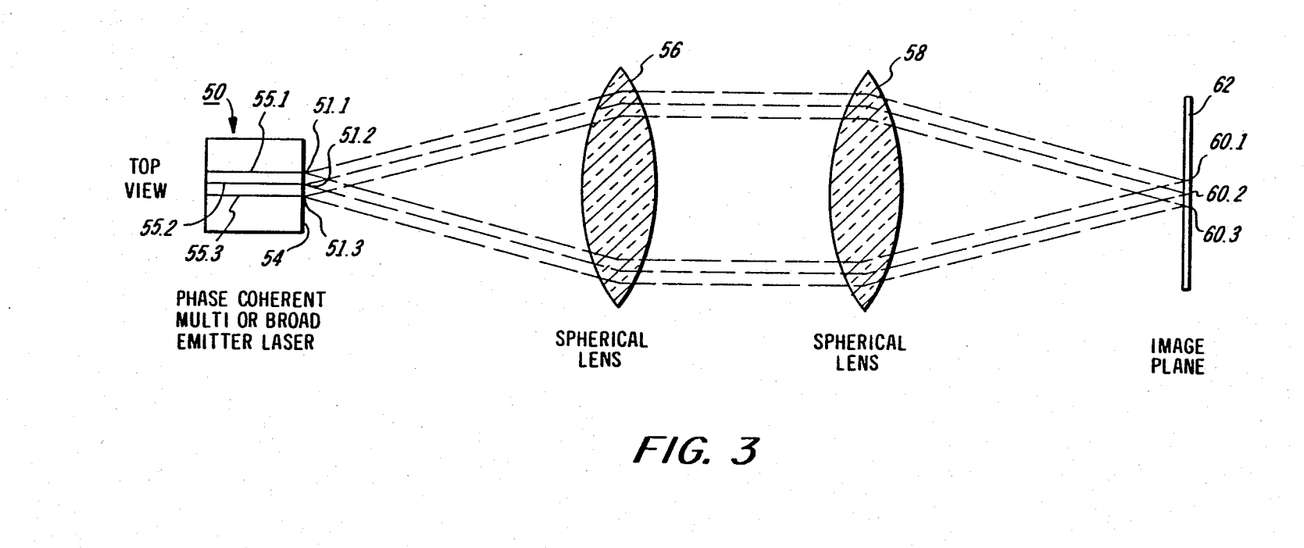
FIG. 3 illustrates the result in using conventional optics with a multi-emitter laser, whether index or gain guided, the result being multi-focused spots at the image plane.

Recently, there has been increased interest in phase locked lasers due to the increased power output provided by a laser over a single filament laser. An early illustration of such a laser is U.S. Pat. No. 3,701,044 to Paoli et al. Paoli et al discloses the optical coupling of adjacent stripe geometry lasers from which a spatially phased locked coherent beam is produced due to the overlapping of the propagating optical wave from one laser optical cavity into an adjacent cavity. A later multi-emitter semiconductor laser is disclosed in the article of D. R. Scifres, R. D. Burnham and W. Streifer entitled "Phase-Locked Semioconductor Laser Array", *Applied Physics Letters*, Vol. 32(12), pp. 1015–1017, Dec. 15, 1978. A still further improved monolithic multi-emitter laser device is disclosed in U.S. Pat. No. 4,255,717 to Scifres et al. The power output of a recent multi-emitter semiconductor laser has been reported recently by Scifres et al at the Optical Fiber Conference in April, 1982, entitled, "Coupled Multiple Stripe Quantum Well Injection Lasers Emitting 400 mW CW". An optically coupled multiple stripe quantum well injection laser was disclosed which emitted up to a total of 400 mW of continuous output power with over 140 mW CW radiation being coupled into an optical fiber. At this writing, these CW power levels have well exceeded 500 mW. What is needed now is an optical system to focus these large power outputs from muti-emitter or braod emitter lasers to a collimated beam or to a focused spot for various applications, previously mentioned. The conventional optical systems for index and gain guided lasers, geometrically illustrated in FIGS. 1 and 2, are not sufficient. This is illustrated in FIG. 3 showing a top view of a multi-emitter index guided phased locked laser 50. The three stripe contact geometry 55.1, 55.2 and 55.3 illustrates the emission of three beams 52.1, 52.2 and 52.3 from points of origin of divergence or beam waist position at the laser facet 54. Using the conventional optional system of FIG. 1 comprising a lens system 56 to collimate the beams and a lens system 58 to focus the beams to the image plane 62 will provide three spatially focused spots 60.1, 60.2 and 60.3. The same multi-spot imaging would be encountered when using the conventional optical system of FIG. 2 with a gain guided laser.

What is needed in this art is an optical system that makes it possible to combine the output power of the multi-emission or broad emission from such a laser to provide a single high power coherent and collimated beam which may be further focused to a single high power spot.

SUMMARY OF THE INVENTION

According to this invention, an optical system is disclosed for producing a single beam from a multi-emitter or broad emitter semiconductor laser comprising a broad phase coherent emission region in one direction and a very small radiation emitting region in the orthogonal direction. Such a broad phase coherent region would normally be fabricated from a common p-n planar junction, e.g., U.S. Pat. No. 4,255,717, although other broad phase coherent regions have also been disclosed and described in the art which do not have a common p-n planar junction, e.g. U.S. Pat. No. 4,280,108.

The pattern for such a laser characteristically has one or more low angular divergence beams along the broad phase coherent emitter direction. These broad low divergence beams constitute the far field radiation pattern of the laser. An optical system must be provided to compensate for these differing orthogonal beams as well as provide a single focused spot from the multi-emitter or broad emitter laser source. This is accomplished by a first lens system to focus radiation in the near field pattern of radiation emitted from the laser in the small emission direction, normally the direction perpendicular to the p-n planar junction, and a second lens system to focus radiation in the far field pattern of radiation emitted from the laser in the lateral emission direction, normally the direction parallel with and along the p-n planar junction, whereby a single collimated beam is produced from the laser output. The lens system may also exclude means to focus the combined near and far field beams in these orthogonal directions resulting in a single collimated beam in both axes.

It should be noted that the present invention is not limited to a multi-emitter laser but is also applicable to a broad emitter laser, i.e., any such emitter capable of producing the phase coherence effect necessary across a broad facet region as at a common p-n junction of the laser.

By collimating and focusing the far field pattern, the highest power interference to be present in the pattern may be imaged and formed into a diffraction limited spot for desired beam spot modulated and scanning applications. Unwanted lower power interference lobes present in the far field pattern may be blocked by using an aperture in the optical system.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 12A, 12B and 12C are photographs of the focus spot at the image plane employing the optical system embodiment of FIGS. 7A and 7B. FIG. 12A shows an unapertured image of the spot with the power output at the image plane being 11 mW. FIG. 12B shows an unapertured image of the spot with the power output at the image plane being 110 mW. FIG. 12C shows an apertured image of the spot with the power output at the image plane being 50 mW.

DISCUSSION OF THE PREFERRED EMBODIMENTS

Figure 4A:
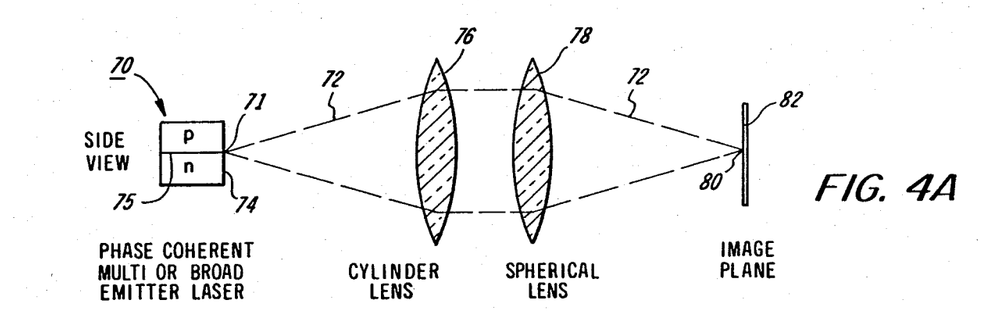
FIGS. 4A and 4B illustrate the generic optical system comprising this invention for employment with a multi-emitter laser.
Figure 4B:
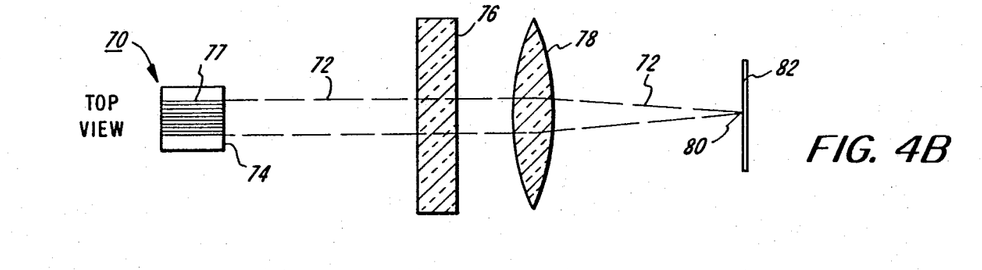
Figure 10:
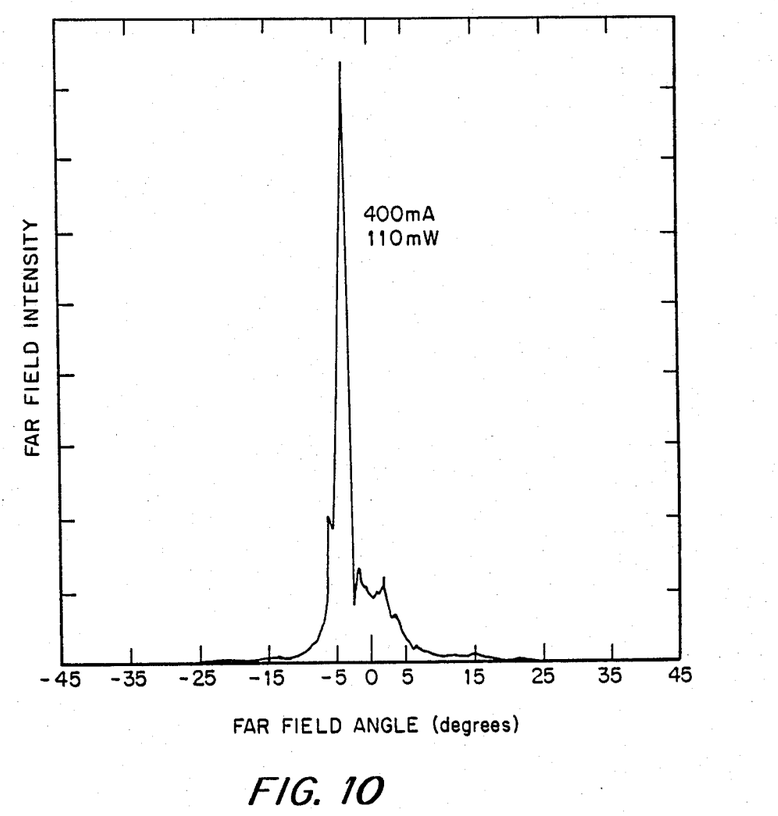
FIG. 10 is the far field pattern of a multi-emitter phase coherent semiconductor laser along the p-n planar junction of the laser.

Reference is made to FIGS. 4A and 4B which illustrate the generic concept of the present invention. As illustrated in FIG. 4A, the multi-emitter phase locked laser 70 has a p-n planar junction 75 and a beam waist position 71 at the plane of that junction located at the laser front facet 74. As shown in the top view of FIG. 4B, the laser 70 has a ten stripe contact geometry at 77, indicative that its emission in the lateral emission direction is ten spatially disposed emitters of radiation in the near field. These ten emitters form a broad and fairly uniform intensity phase coherent readiation emitting source. An example of the near field intensity profile as a function of spatial position for such a laser is illustrated in FIG. 10.

The phased laser 70 may be either of the index or gain guided type. This is because in the vertical emission direction of the laser illustrated in FIG. 4A, imaging is being accomplished for the near field pattern of emission at the laser facet 74, in this case refocusing that pattern to a spot 80 at the image plane 82. However, in the lateral emission direction of the laser illustrated in FIG. 4B, reimaging is being accomplished for the far field pattern of emission outside and beyond the laser facet 74 at a theoretical focal point at infinity. In this case, the far field pattern is focused to the spot 80 at the image plane 82. Since the far field pattern may provide one or more diffracted orders or interference lobes due to phased locked emission providing interference or radiation in the region between the near and far field, the single principal diffracted order or interference lobe may be formed into a collimated beam or onto an image plane, as illustrated in FIGS. 4A and 4B.

The optical system of FIGS. 4A and 4B to focus the beam 72 in the vertical near field and in the lateral far field comprises lens system 76 and 78. In the vertical direction, cylinder lens 76 collimates the near field pattern and spherical lens 78 refocuses the collimated beam 72 at a spot 80 onto image plane 82. In the lateral direction, cylinder lens 76 has no optical effect but spherical lens 74 focuses the lateral far field pattern to the spot 80 at the image plane 82.

The ability to refocus the lateral direction emission depends on the degree of coherence across the laser emission pattern.

Figure 5A:
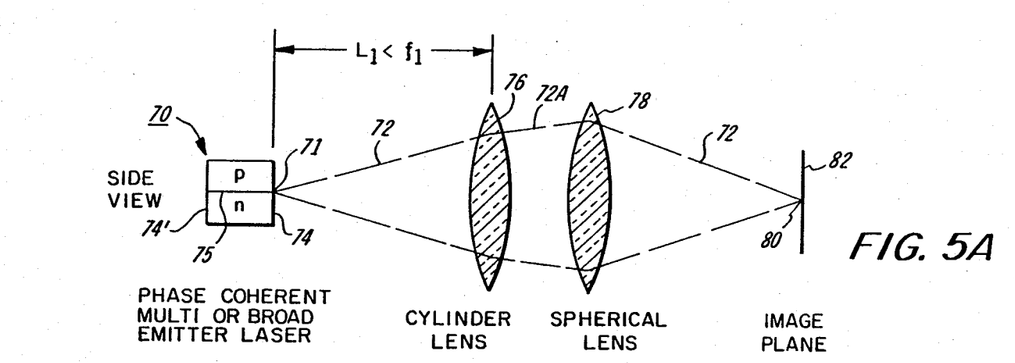
FIGS. 5A and 5B are similar to FIGS. 4A and 4B except that the angular divergence of the multi-emitter beam output is taken into consideration.
Figure 5B:
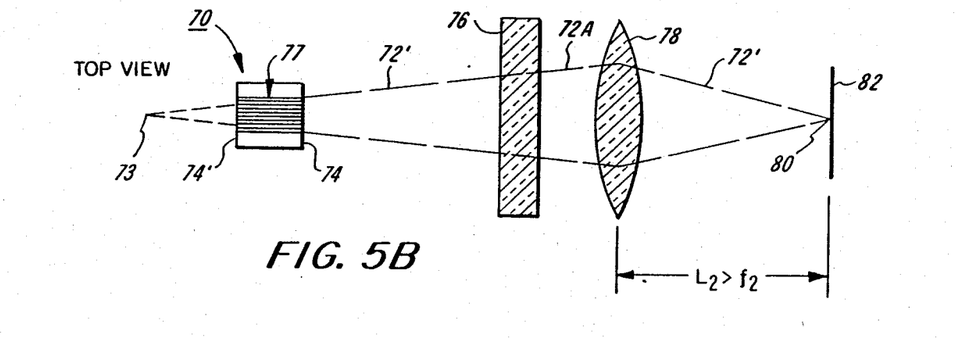

While the generic optical system for reimaging shown in FIG. 4 is quite applicable, better refocusing can be accomplished by taking into consideration the angle of beam divergence in the lateral direction caused by diffraction due to the finite width of the laser. This diffraction makes the far field pattern appear to diverge from a virtual point source 73 behind the rear laser facet 74′, as illustrated to FIG. 5B. The optics shown in FIGS. 5A and 5B enable compensation for this effect and thereby achieve better focus. As illustrated in FIGS. 5A and 5B, the correction required, due to the finite divergence of the lateral far field beam 72′, may be obtained by first, focusing the lateral far field beam 72′ into a spot 80 on the image plane 82 by adjustment of the spherical lens 78 such that lens 78 lies at a distance $L_2$ which is slightly larger than the focal length $f_2$ of lens 78. Next, cylinder lens 76 is adjusted so that it lies at a distance $L_1$ which is slightly smaller than the focal length $f_1$ of lens 76 to make the vertical near field of the beam 72 lie at the same spot 80 as the focus spot of the far field beam. This adjustment corresponds to changing the divergence angle of beam 72 to be that of this beam at position 72A in FIG. 5A, the beam at 72A having the same divergence angle as beam 72′ at this same point in FIG. 5B thereby allowing imaging of both the vertical near field spot at 71 and the lateral far field beam 72′ onto a common image plane 82.

FIG. 6 illustrates another embodiment for reimaging the beam from the multi-emitter laser 70. The difference illustrated here relative to the previous embodiment lies in the manner of refocusing to an intermediate image plane at spot 80′ and the use of an aperture 79 to block undesirable side or lower power interference lobes or diffraction orders that may be present in the far field pattern.

Figure 6A:
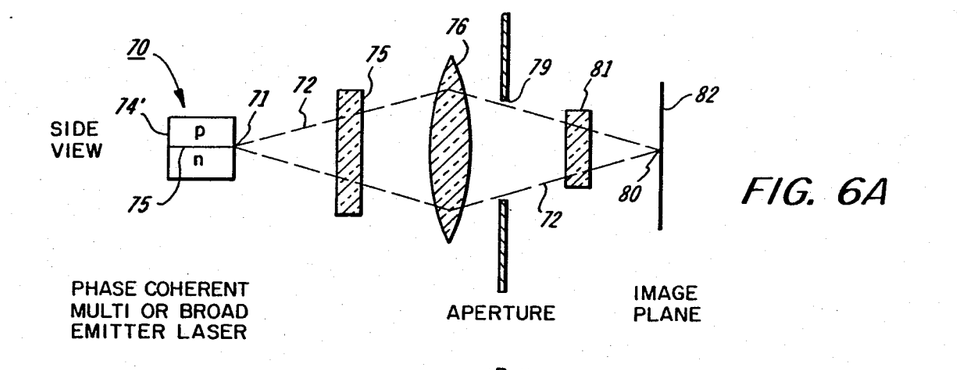
FIGS. 6A and 6B illustrate another embodiment for an optical system comprising this invention and employing an aperture.
Figure 6B:
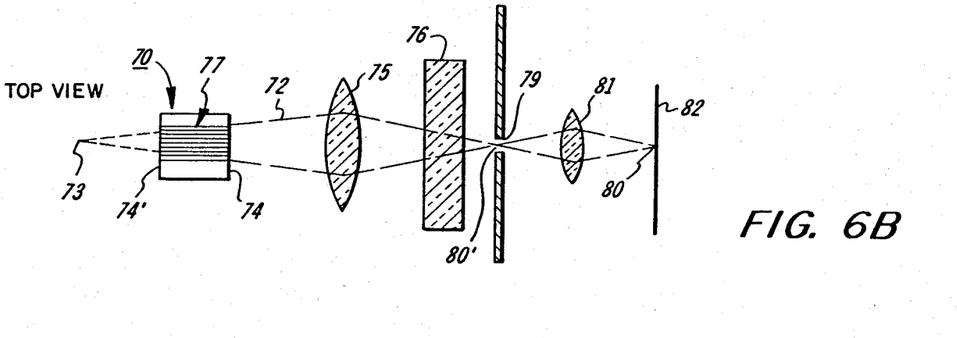

The optical system of FIG. 6 differs from previous embodiments in that, in the vertical emission direction illustrated in FIG. 6A, the optical system for the near field pattern or beam waist position at 71 is focused onto image plane 82 by means of the cylinder lens 76 via the aperture 79. The optical system for the far field lateral pattern illustrated in FIG. 6B is first focused to an image plane at the aperture 79 by means of the cylinder lens 75. Focusing to the aperture 79 in the lateral emission direction forms an apertured spot 80′ which, with cylinder lens 81 with a properly selected focal length, reimages spot 80′ to spot 80 at the image plane 82.

The optical system of FIG. 7 is similar to the optical system of FIG. 4 but differs in that reimaging in the lateral emission direction is accomplished initially for reimaging to the image plane in a manner somewhat similar to FIG. 6B.

Figures 7A, 7B:
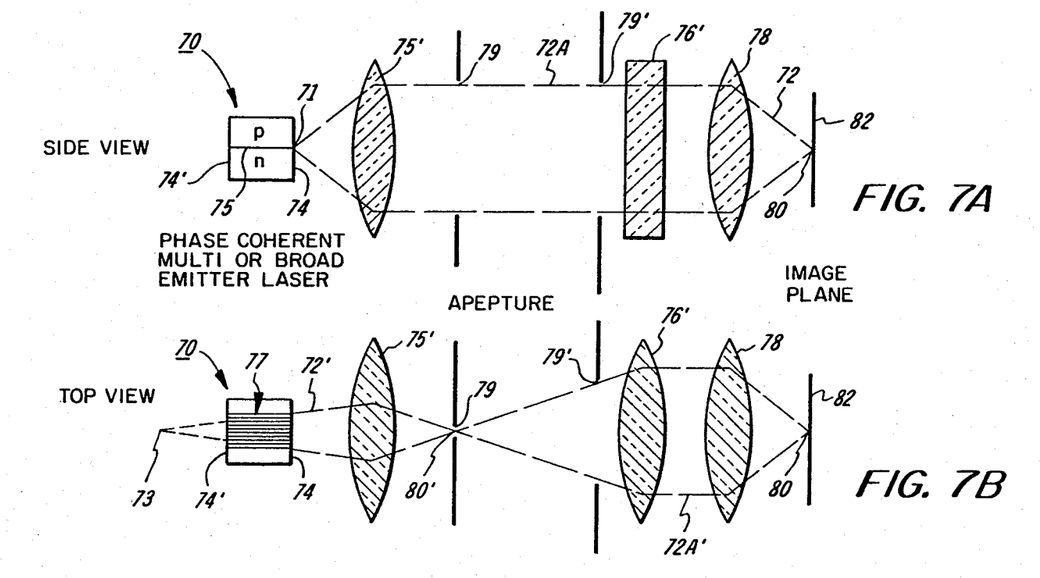
FIGS. 7A and 7B illustrate a still further embodiment for an optical system comprising this invention and employing an aperture to bring to focus only the principal power diffraction order.

In the vertical emission direction illustrated in FIG. 7A, the near field spot 71 emission is collimated by spherical lens 75′ and the collimated beam 72A is refocused to spot 80 at the image plane 82 by means of spherical lens 78. Spot 80 in FIG. 7A, therefore, is an image of the near field spot at 71. In the lateral emission direction illustrated in FIG. 7B, the same spherical lens 75′ reimages the far field pattern 72′ to a spot 80′ at aperture 79. Spot 80′ is then reimaged by cylinder lens 76′ to a collimated beam 72A′, which is refocused to spot 80 in the image plane 82 by spherical lens 78.

It should be noted that aperture 79 is not necessary if a single low divergence far field lobe, vis a vis a multiple far field lobe pattern, is emitted by the laser since only a single spot will be formed at the image plane 82 under these conditions. Also, it should be noted that other apertures may be positioned at other locations in the optical path, such as illustrated at 79′ in FIGS. 7A and 7B, in order to select a single radiation beam angle.

Figure 7C:
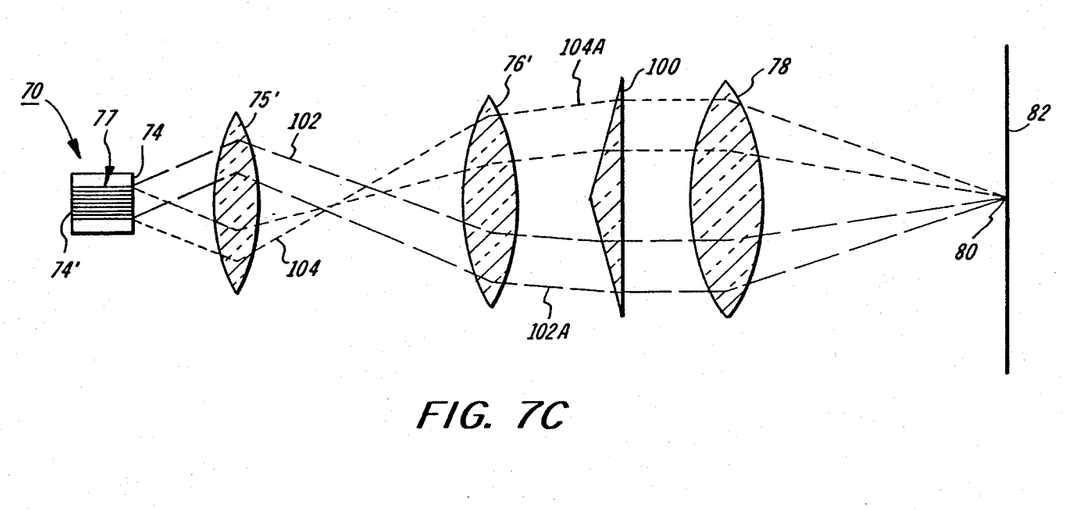
FIG. 7C illustrates an even further embodiment for an optical system comprising this invention and employing a prism to bring to focus more than one coherent low diverence beam from a single source to collimation and focus.

Lastly, it should be noted that where two or more low divergence beams may be present in the lateral emission direction, such as angularly emitted beams 102 and 104 illustrated in FIG. 7C, absolute collimation of these beams together is not possible at the same position as lens 76′, as illustrated at beams positions 102A and 104A. Finality in collimation may be achieved by a multifacted prism 100 positioned between lens 76′ and 78. Prism 100 brings the two beams 102 and 104 into final collimation at lens 78 for focus to a single spot 80.

Figure 8A:
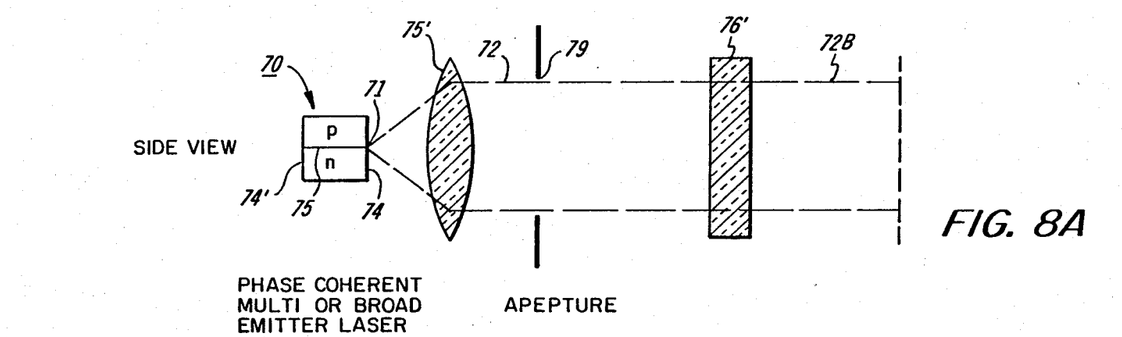
FIGS. 8A and 8B illustrate the embodiment shown in FIGS. 7A and 7B but without means to focus the collimated beam to a spot at an image plane.
Figure 8B:
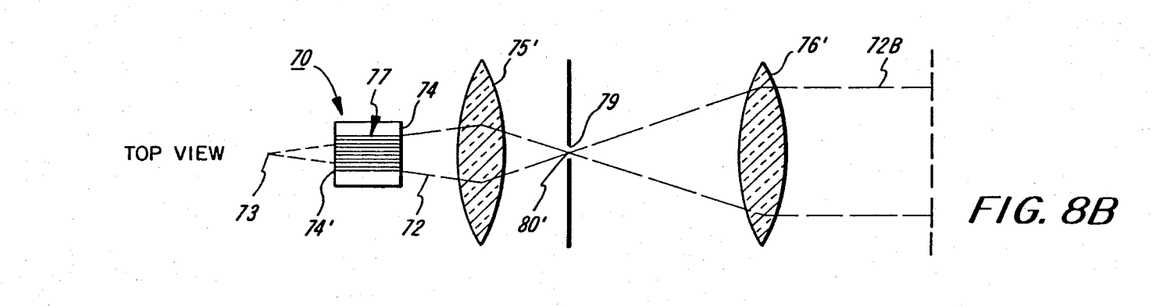
Figure 9A:
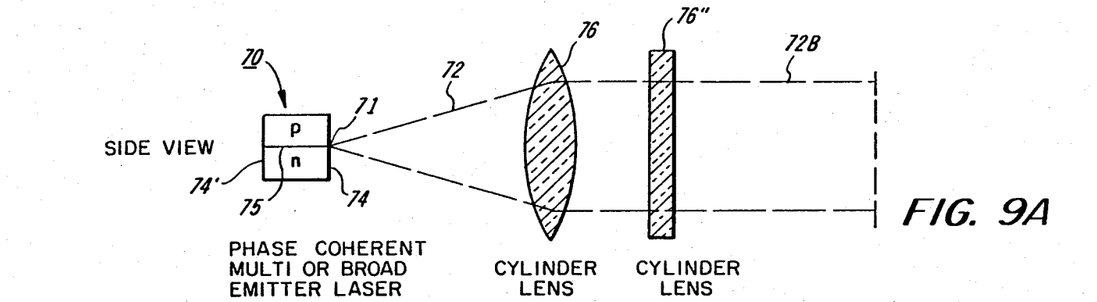
FIGS. 9A and 9B illustrate the embodiment shown in FIGS. 5A and 5B but without means to focus the collimated beam to a spot at an image plane.
Figure 9B:
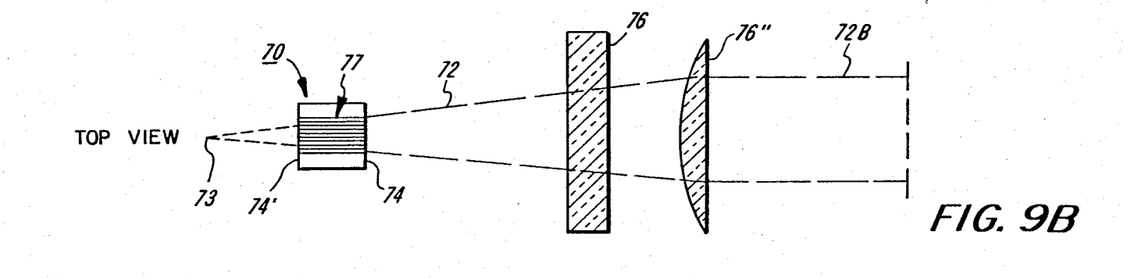

FIGS. 8A and B and FIGS. 9A and B are basically the embodiments respectively shown in FIGS. 7A and 7B and FIGS. 5A and 5B but absent the spherical lens 78 for refocusing the collimated beam 72 to a spot 80. In FIGS. 8A and 8B, the cylinder lens 75′ collimates the vertical near field emission while focusing the lateral far field emission to spot 80′. Cylinder lens 76′ reimages the vertical and lateral beam 72 to collimation, forming the orthogonal collimated beam 72B. In FIGS. 9A and 9B, the cylinder lens 76 collimates the vertical near field emission while the cylinder lens 76″ collimates the lateral far field emission forming the orthogonal collimated beam 72B.

EXAMPLE OF REDUCTION TO PRACTICE OF A PREFERRED EMBODIMENT

Reference is now to a specific example of the invention relative to the optical system disclosed in FIGS. 7A and 7B. This example is intended for purposes of clarity and exemplification of the claimed invention and for documentation of actual reduction to practice without intentionally placing unnecessary limitations on its scope or utility as will be appreciated by those of ordinary skill in the optics art.

The laser employed comprised a multi-emitter semiconductor laser 70 having ten phase locked emitters, as represented at 77 in FIG. 7B, capable of emitting up to about 200 mW or CW output power (approximately 200 mW per laser facet) at 7700 Å. The external differential quantum efficiency from both facets was about 65%. Laser 70 consisted of 10 parallel proton implanted 3 micron wide stripe geometry lasers on 10 micron centers on a single semiconductor substrate of n-type GaAs. There are no direct couplers between the stripes along the length of the laser as disclosed in U.S. Pat. No. 4,255,717. Rather, phase locking is achieved by overlapping wave coupling due to the close proximity of adjacent laser cavities, as found in the structure disclosed in the Scifres et al article entitled "Phase-Locked Semiconductor Laser Array", supra. In addition, the active region of the laser consisted of a single 600 Å thick layer of undoped $Ga_{0.85}Al_{0.15}As$. The p- and n-type cladding layers were composed of $Ga_{0.35}Al_{0.65}As$ and were 2.5 microns thick. A 0.6 micron thick p+ GaAs cap layer was used to obtain good ohmic contact. Buffer layers approximately 0.5 mm thick and composed of $Ga_{0.8}Al_{0.2}As$ were fabricated between the substrate and the n-type cladding layer and between the p-type cladding layer and the p+ GaAs cap. The proton damage extended through the cap layer to a depth of about 1 micron. The laser chips were cleaved to a length of 250 mm and were mounted p-side down with Indium solder. The lasers were operated under both pulsed (300 nsec pulse width, 5 KHz repetition rate) and CW conditions.

As to the optical system employed, the radiation was collected by the high numerical aperture microscope lens 75', specifically a 40×, 0.65 N.A. objective. The vertical near field emission was collimated by the objective lens 75' while the lateral far field emission was focused behind the objective to spot 80'. Although the laser beam is highly collimated in the lateral direction, it still diverges slightly, as previously mentioned, due to diffraction, causing the far field focus point to ocur at a distance slightly beyond the focal length of lens 75'.

Cylinder lens 76' had a 333 mm focal length and was used to collimate the light emerging from the focused far field spot 80'. This collimated beam is then focused by the lens 78, specifically a 20×, 0.4 N.A. objective, to the spot 80 on image plane 82.

Because phase locked lasers may emit some power into other lateral directions, it may be desirable to use the slit aperture 79 at the lateral far field focal point to eliminate all but the primary lateral far field interference lobe. For the multi-emitter laser detailed here, it was desirable to employ an aperture, as determined by its far field pattern shown in FIG. 10. In order to access the position where the aperture was needed, a portion of the housing on the objective lens 75' had to be removed.

The current level employed laser operation was 400 mA and the output power per facet was at 110 mW. As is evident from FIG. 10, 60–70% of the optical power is concentrated in a single low divergence interference lobe at an angle of about minus 4° from the facet normal. The emission at an angle of about 4° from the facet normal is due to the fact that there is a non-zero phase shift between the laser emitters. The half width of the far field pattern is about 1.3°. This is to be compared to the theoretical divergence limit from a uniformly illuminated 93 μm wide aperture which would be about 0.5°.

In order to demonstrate that the laterally collimated output beam may be focused to a single spot, the laser 70 was aligned in the optical system shown in FIG. 7. Shown in FIG. 11 is the pulsed optical output vs. current curves 90 and 92, repsectively, for the output at the front facet 74 of the laser and for the output at the image plane 82.

Figure 11:
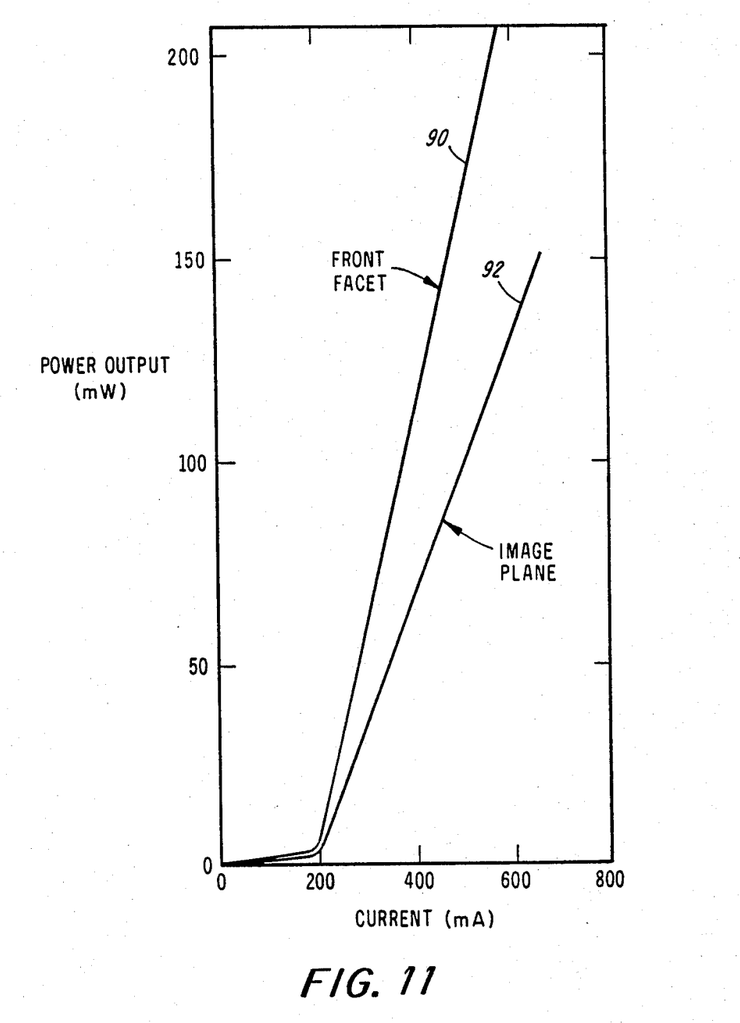
FIG. 11 is a graph illustrating the power output in milliwatts versus current in milliamperes for the output emission from a multi-emitter phase coherent semiconductor laser at the front facet and at the image plane employing the optical system embodiment of FIGS. 7A and 7B.

As shown in FIG. 11, the laser threshold is about 200 mA, corresponding to a threshold current density of 800 A/cm$^2$. The output vs. current curve 90 at the facet is linear to over 200 mW. Under DC bias conditions, the laser threshold is about 210 mA and the device fails catastrophically at a CW output of 210 mW from an unprotected or uncoated facet. The output vs. current curve 92 at the image plane is also linear indicating that the laser mode pattern is stable with increasing current. Approximately 60% of the optical power emitted from the laser facet is transferred to the image plane 82 by the optical system.

Figure 12A:
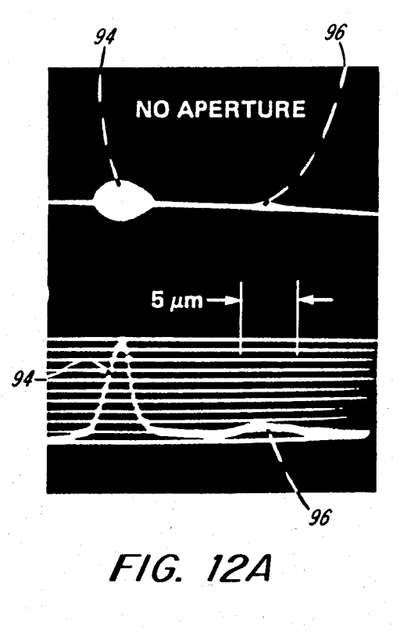

Focused spots produceable at the image plane 82 by the optical system of FIG. 7 are shown in FIG. 12, along with corresponding lateral intensity scan lines indicative of output power intensity. Specifically, FIG. 12A shows imaged spots 94 and 96 when the optical power at the image plane 82 is measured at about 11 mW. In this case, no aperture 79 was employed to eliminate lower power far field lobes 96 emitted at angles other than the primary lobe. The primary lobe at about minus 4° can be seen imaged at spot 94.

Figure 12B:
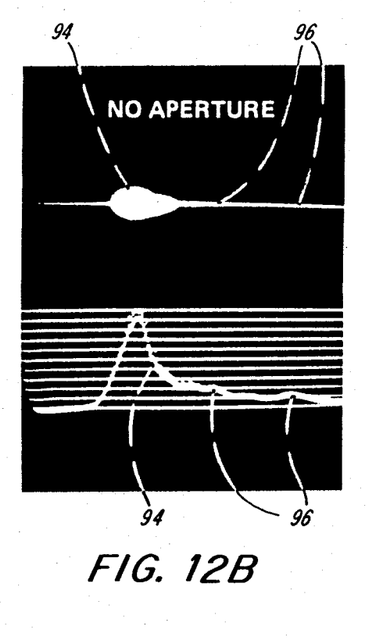

FIG. 12B shows an unapertured image with 110 mW at the image plane 82. As shown by the lateral intensity scan lines, about 70% of the power lies in the dominant imaged spot 94 while other power is emitted at different far field and larger angles indicated at 96.

Figure 12C:
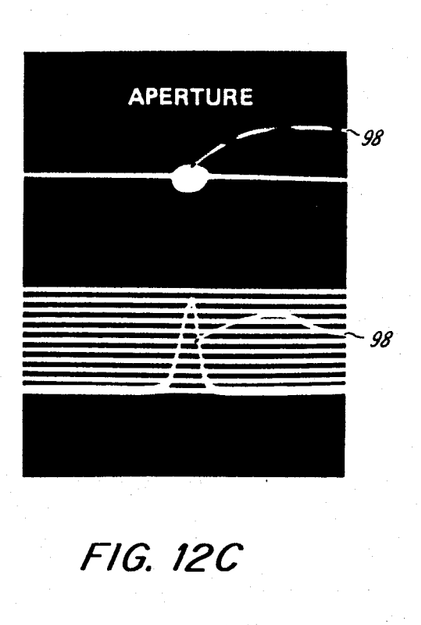

FIG. 12C shows apertured image with aperture 79 placed in the optical system as illustrated in FIG. 7. In this case, a uniform spot 98 of about 2.5 μm diameter and containing 50 mW of output power was formed. The half width of the spot 98 based on an intensity scan is about 2.0 μm, which is near the diffraction limit (approximately 1.9 μm) of the 20×, 0.4 N.A. focusing objective lens 78. Optics employed were ordinary microscope objectives which were not antireflection coated for infrared emission from the laser 70.

In conclusion, a phase-locked multi-emitter laser can emit over 150 mW of output power into a single stable low divergence lateral beam. By employing an optical system in which the lateral far field pattern is imaged, this type of laser can be collimated and brought to focus in a single spot, thus allowing these high power semiconductor devices to be used in higher power applications, such as laser printing and optical recording.

While the invention has been described in conjunction with specific embodiments, it is evident that many alternatives, modifications and variations will be apparent to those skilled in the art in light of the foregoing description. For example, as previously mentioned, phase coherent broad emitter lasers with fairly uniform emission intensity across a broad lateral region of the laser facet may be focused to a spot using the optical system of this invention. Also, depending upon the degree of concentration of the laser radiation into a single principal diffracted order or interference lobe, it may be desirable to recombine the radiation from two or more diffracted orders through the use of a mirror, grating assembly or prism, the latter having been previously illustrated in the discussion. Since the diffracted beams emerge from the laser at different angles, the prisms may be employed to render the emerging beams colinear. The prisms can be replaced with angled mirrors or diffraction grating segments with different spatial frequencies to achieve the same result.

Accordingly, the invention is intended to embrace all such alternatives, modifications, and variations as fall within the spirit and scope of the appended claims.

What is claimed is:

1. An optical system said system including a lens system for collimating the radiation from a semiconductor laser, the laser near field having a single beam waist position in a first spatial direction near the emission facet of said laser and having an elongated but phase coherent near field emitting pattern in a second spatial direction which forms a far field pattern of low divergence beams,
    said lens system for imaging said near field of said single beam waist position in said first spatial direction while imaging said elongated, phase coherent far field radiation beam pattern in said second spatial direction,
    said lens system including means to image said far field radiation beam pattern in said second spatial direction to an intermediate image plane and
    aperture means positioned at said intermediate image plane to block one or more lower power diffraction orders present in said far field radiation beam pattern.

2. The optical system of claim 1 wherein said elongated emitting pattern comprises two or more spatially separated but phase coherent emitting regions.

3. The optical system of claim 1 wherein the output provided by said lens system is a single beam collimated in both said first and second spatial directions.

4. The optical system of claim 3 further including a lens means to focus said beam in both said first and second spatial directions to a final image plane.

5. The optical system of claim 4 wherein said lens system includes a combination of a cylinder lens and a pair of spherical lenses, the first of said spherical lenses having a focal length to respectively collimate and image said beam in said first spatial direction, the first of said spherical lenses also positioned to focus said beam in said second spatial direction to a spot at said intermediate image plane, said cylinder lens to thereafter collimate said beam in said second spatial direction, the second of said spherical lenses positioned to focus said beam in both said first and second spatial directions onto said final image plane.

6. The optical system of claim 5 wherein said lens system includes additional aperture means in the path of said beam beyond said aperture means to limit the angle of acceptance of said far field radiation beam pattern.

* * * * *